US012793540B2

(12) United States Patent
Di Lorenzo et al.

(10) Patent No.: US 12,793,540 B2
(45) Date of Patent: Nov. 10, 2026

(54) SYSTEMS AND METHODS FOR DETECTING TRAFFIC SIGNAL VIOLATIONS WITH REDUCED POWER CONSUMPTION

(71) Applicant: Verizon Patent and Licensing Inc., Basking Ridge, NJ (US)

(72) Inventors: David Di Lorenzo, Florence (IT); Niccolo Bellaccini, Florence (IT); Leonardo Taccari, Florence (IT); Alessio Sanfratello, Lamporecchio (IT)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 37 days.

(21) Appl. No.: 18/644,748

(22) Filed: Apr. 24, 2024

(65) Prior Publication Data

US 2025/0336288 A1 Oct. 30, 2025

(51) Int. Cl.
*G08G 1/01* (2006.01)
*G06Q 10/109* (2023.01)
*G06V 20/58* (2022.01)

(52) U.S. Cl.
CPC ....... *G08G 1/0125* (2013.01); *G06Q 10/1097* (2013.01); *G06V 20/584* (2022.01); *G08G 1/0112* (2013.01)

(58) Field of Classification Search
CPC .. G08G 1/0125; G08G 1/0112; G06V 20/584; G06Q 10/1097
See application file for complete search history.

(56) References Cited

U.S. PATENT DOCUMENTS 6,647,361 B1 * 11/2003 Laird .................... G07B 15/06 701/119
2017/0337435 A1 * 11/2017 Uliyar .............. G06V 30/19173
2023/0054145 A1 * 2/2023 McAlister ............ B60W 50/14

* cited by examiner

*Primary Examiner* — Andrew J Cromer

(57) ABSTRACT

A device may receive data identifying danger zones for traffic signals associated with a vehicle, and may identify a set of danger zones for the vehicle. The device may retrieve a current location, direction, and speed of the vehicle based on determining that the vehicle has not reached a point of no return with respect to the set of danger zones. The device may identify a danger zone for the vehicle based on the current location, direction, and speed of the vehicle, and may process a video frame, with a model and based on determining that the vehicle has reached a point of no return with respect to the danger zone, to determine whether a traffic signal in the danger zone indicates proceed, stop, or yield. The device may perform one or more actions based on determining whether the traffic signal in the danger zone indicates proceed, stop, or yield.

20 Claims, 12 Drawing Sheets

SYSTEMS AND METHODS FOR DETECTING TRAFFIC SIGNAL VIOLATIONS WITH REDUCED POWER CONSUMPTION

BACKGROUND

Vehicular safety and traffic compliance may require real-time analysis of a driver's behavior in relation to traffic signals. Traditional vehicular safety and traffic compliance systems are separate from vehicles and employ complex artificial intelligence (AI) models that analyze live video feeds from the vehicles to detect potential traffic violations, such as running a red light.

DETAILED DESCRIPTION OF EXAMPLE EMBODIMENTS

Figure 1A:
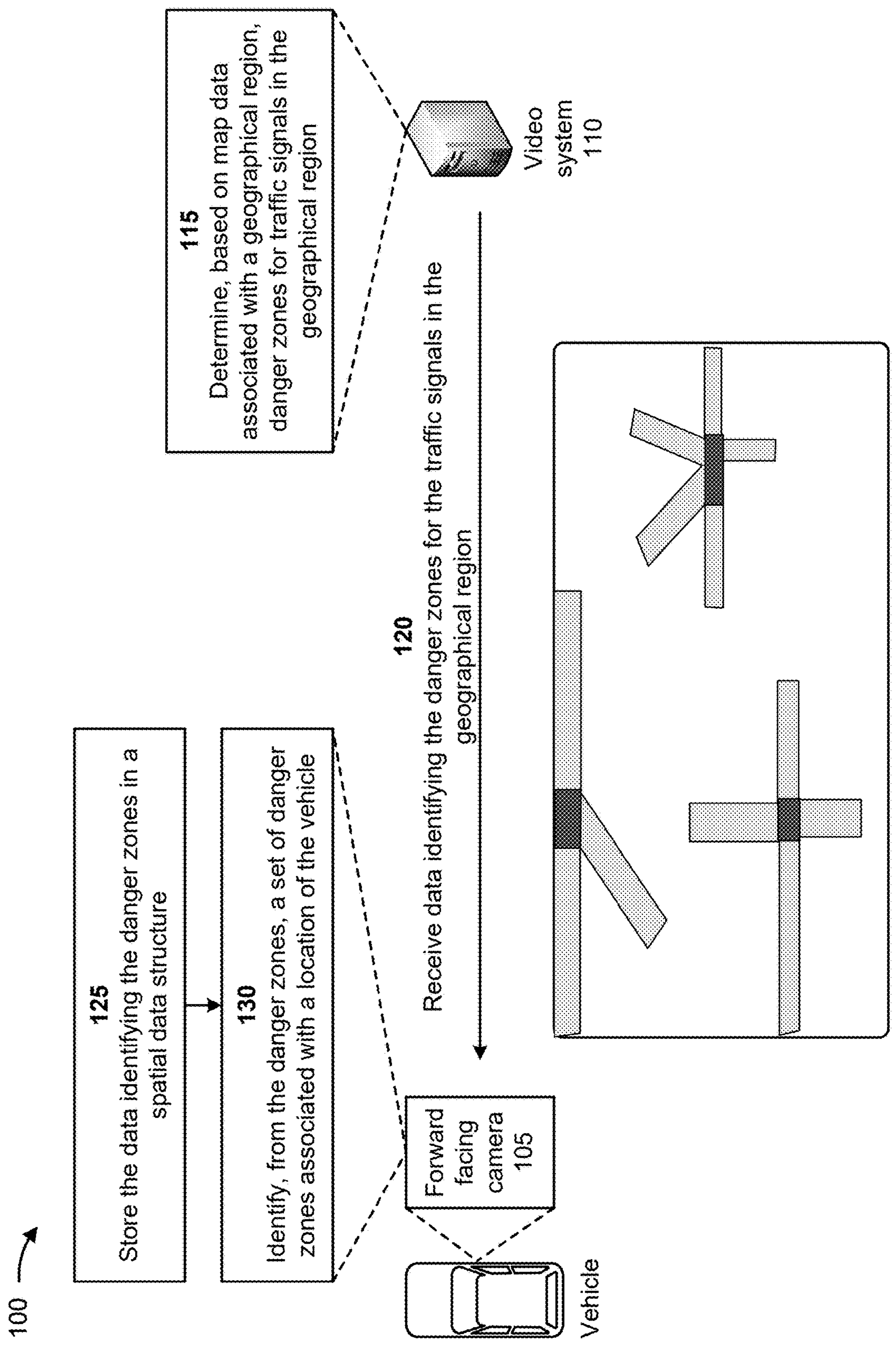
FIGS. 1A-1H are diagrams of an example associated with detecting traffic signal violations with a forward facing camera of a vehicle.

The following detailed description of example implementations refers to the accompanying drawings. The same reference numbers in different drawings may identify the same or similar elements.

Utilizing complex AI models, with in-vehicle devices (e.g., a vehicle control systems), to locally analyze live video feeds from the vehicle presents several challenges. For example, in order to successfully take advantage of existing AI models to process video, each frame must be examined by the model, which is computationally intensive, and many in-vehicle devices fail to have the requisite computational power to support such continuous operations. To circumvent this limitation, some in-vehicle devices use oversimplified models or execute AI models at reduced frequencies, which compromises a timeliness and an accuracy of a traffic violation detection. A delayed alert about a traffic violation may result in safety hazards for vehicles and drivers. Thus, current techniques for detecting potential traffic violations consume computing resources (e.g., processing resources, memory resources, communication resources, and/or the like), networking resources, and/or other resources associated with failing to provide accurate traffic violation detections, erroneously warning a driver of the vehicle based on inaccurate traffic violation detections, failing to provide timely warnings associated with traffic violation detections, erroneously manipulating the vehicle based on inaccurate traffic violation detections, and/or the like.

Some implementations described herein provide a system and method that detects traffic signal violations using a vehicle camera system with significantly reduced power consumption. For example, the vehicle camera system may include a forward-facing camera that receives video data while the system identifies danger zones for traffic signals in a geographical region of the vehicle, and may store the data identifying the danger zones in a spatial data structure. The vehicle camera system may identify, from the danger zones, a set of danger zones associated with a location of the vehicle, and may determine, based on the location, a direction, and a speed of the vehicle, whether the vehicle has reached a point of no return with respect to the set of danger zones. The vehicle camera system may retrieve a current location, direction, and speed of the vehicle based on determining that the vehicle has not reached the point of no return with respect to the set of danger zones, and may identify, from the set of danger zones, a danger zone for the vehicle based on the current location, direction, and speed of the vehicle. The vehicle camera system may determine, based on the current location, direction, and speed of the vehicle, whether the vehicle has reached a point of no return with respect to the danger zone, and may process a video frame, with a model and based on determining that the vehicle has reached the point of no return with respect to the danger zone, to determine whether a traffic signal in the danger zone indicates proceed, stop, or yield. The vehicle camera system may perform one or more actions based on determining whether the traffic signal in the danger zone indicates proceed, stop, or yield.

In this way, the vehicle camera system detects traffic signal violations associated with the vehicle. For example, the vehicle camera system may determine whether a vehicle has passed a point of no return with respect to a danger zone based on the vehicle's speed, direction, and distance to the danger zone, and may process a video frame to determine a state of a traffic signal when the vehicle is past the point of no return. The vehicle camera system may alert a driver when a red traffic signal is detected and the vehicle is past the point of no return. The vehicle camera system may efficiently utilize computational resources by employing conditional processing of video camera frames, preemptive calculations of danger zones, and minimal continuous high-frame-rate processing. The vehicle camera system may utilize selective video frame processing and a spatial data structure for danger zone retrieval to optimize performance and to ensure that computational resources are utilized only when there is a high probability of a traffic violation. Thus, the vehicle camera system may conserve computing resources, networking resources, and/or other resources that would have otherwise been consumed by failing to provide accurate traffic violation detections, erroneously warning a driver of the vehicle based on inaccurate traffic violation detections, failing to provide timely warnings associated with traffic violation detections, erroneously manipulating the vehicle based on inaccurate traffic violation detections, and/or the like.

FIGS. 1A-1H are diagrams of an example 100 associated with detecting traffic signal violations with a forward facing camera of a vehicle (e.g., a vehicle camera system). As shown in FIGS. 1A-1H, example 100 includes a forward facing camera 105 associated with a vehicle and a video system 110. The forward facing camera 105 may capture video data associated objects (e.g., pedestrians, traffic signs, traffic signals, road markers, and/or the like) appearing in front of the vehicle. The video system 110 may include a system that receives and processes video data generated by the forward facing camera 105. Further details of the forward facing camera 105 and the video system 110 are provided elsewhere herein. Although implementations described herein depict a single vehicle and a single forward facing camera 105, in some implementations, the video system 110 may be associated with multiple vehicles and/or multiple forward facing cameras 105.

As shown in FIG. 1A, and by reference number 115, the video system 110 may determine, based on map data associated with a geographical region, danger zones for traffic signals in the geographical region. For example, the video system 110 may receive map or geospatial data associated with a geographical region. The map data may include data identifying road topology and traffic signal positions within the geographical region (e.g., a geographical region associated with the vehicle). The road topology data may include data identifying the shapes, widths, and geometries of roads around the traffic signals, and the traffic signal positions may include global positioning system (GPS) locations of the traffic signals. In some implementations, the forward facing camera 105 may receive and store the map data associated with the geographical region. The entire map data may be stored on the forward facing camera 105 (e.g., and encoded to reduce memory size) or may be split into smaller portions and with the forward facing camera 105 may automatically download portions relative to a current driving area. In some implementations, the forward facing camera 105 and/or the video system 110 may periodically receive updates to the stored map data in order to maintain any traffic signal changes.

The map data may not include GPS positions of stop lines relative to every traffic signal. Thus, the video system 110 may estimate the stop lines relative to traffic signals based on the map data. The video system 110 may utilize the stop lines to determine the danger zones (e.g., areas in which collisions might occur if vehicles fail to stop at a traffic signal in a stop state) for the traffic signals in the geographical region. In some implementations, the stop lines may be located on the perimeters of danger zones.

In some implementations, the video system 110 may utilize a model to determine, based on the map data, the danger zones for traffic signals in the geographical region. A danger zone may include an area where a collision might occur if a vehicle fails to stop at a traffic signal in a stop state (e.g., a red light). From the map data, the model may determine road segments that belong to an intersection by identifying road segments within a short radius of the traffic signal position, indefinitely extending each of the road segments, determining whether the extended road segments include the traffic signal position, and saving the road segments that include the traffic signal (e.g., and excluding the road segments that fail to include the traffic signal). For every road segment associated with the intersection, the model may determine an overlap area with all of the other road segments, and may save a road segment with a first occurring intersection (e.g., while travelling towards the traffic signal). The model may generate a line perpendicular to a road direction (e.g., which includes the intersection, the road segment, and the width of the road), and may add line segments to a list of stop lines. For every road segment associated with the intersection, the model may generate two lines perpendicular to the road direction, centered on the traffic signal and a distance (e.g., in meters) apart, and may add such line segments to the list of stop lines. The model may determine a danger zone as a convex hull of all the stop lines and the traffic signal position. In some implementations, the model may ensure that a danger zone is never empty, which may occur when there is a traffic signal without a road intersection (e.g., for a crosswalk). In such implementations, the model may identify a danger zone that includes a small crossing region around the traffic signal. In some implementations, the video system 110 may store data identifying the danger zones for the traffic signals in the geographic region (e.g., a in data structure associated with the video system 110).

As further shown in FIG. 1A, and by reference number 120, the forward facing camera 105 may receive data identifying the danger zones for the traffic signals in the geographical region. For example, the forward facing camera 105 may continuously receive the data identifying the danger zones for the traffic signals in the geographical region from the video system 110, may periodically receive the data identifying the danger zones for the traffic signals in the geographical region from the video system 110, may receive the data identifying the danger zones for the traffic signals in the geographical region based on requesting the data identifying the danger zones from the video system 110, and/or the like. In some implementations, when the forward facing camera 105 receives new data identifying danger zones for traffic signals in a new geographical region, the forward facing camera 105 may remove (e.g., from memory) the data identifying the danger zones for the traffic signals in the geographical region.

As further shown in FIG. 1A, and by reference number 125, the forward facing camera 105 may store the data identifying the danger zones in a spatial data structure. For example, the forward facing camera 105 may include a data structure (e.g., database, a table, a list, and/or the like) for storing information. The forward facing camera 105 may store the data identifying the danger zones in the data structure, which may enable the forward facing camera 105 to identify a traffic signal position and a corresponding danger zone for every traffic signal encountered by the vehicle. In some implementations, the forward facing camera 105 may store the data identifying the danger zones in a spatial data structure that enables efficient retrieval of a set of danger zones within a short distance from a current vehicle position. In some implementations, the spatial data structure may include a k-d tree data structure.

As further shown in FIG. 1A, and by reference number 130, the forward facing camera 105 may identify, from the danger zones, a set of danger zones associated with a location of the vehicle. For example, the forward facing camera 105 may continuously receive a GPS location of vehicle as the vehicle is traveling at a location. The forward facing camera 105 may access the spatial data structure to efficiently retrieve and identify the set of danger zones associated with the location of the vehicle (e.g., within a predetermined distance from the current vehicle position). For example, the forward facing camera 105 may utilize the spatial data structure to quickly identify which danger zones are relevant (e.g., the set of danger zones) based on the vehicle's current location, thereby optimizing computational resources.

Figure 1B:
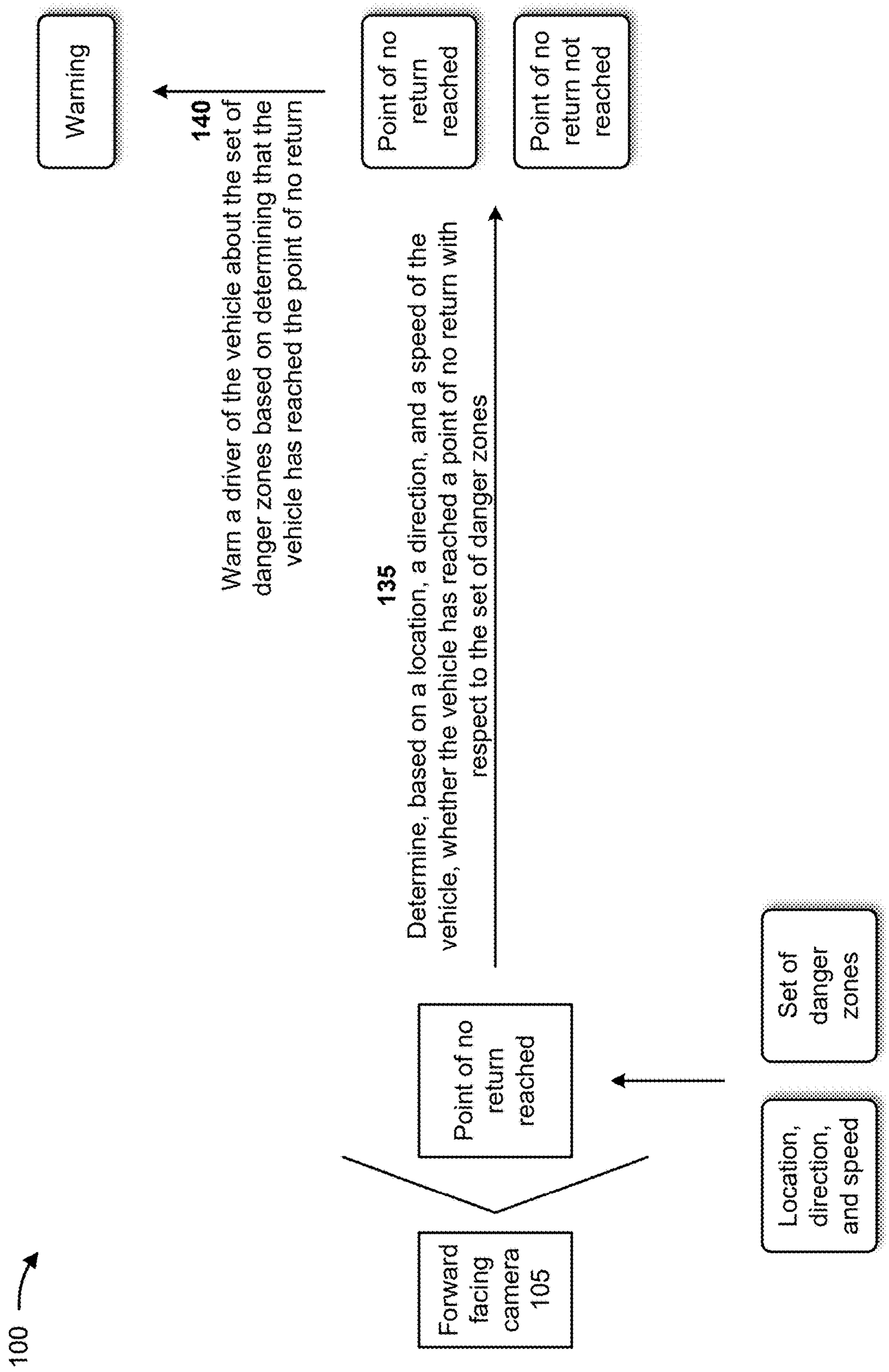

As shown in FIG. 1B, and by reference number 135, the forward facing camera 105 may determine, based on a location, a direction, and a speed of the vehicle, whether the vehicle has reached a point of no return with respect to the set of danger zones. For example, the forward facing camera 105 may continuously receive (e.g., from a vehicle control system) the location, the direction, and the speed of the vehicle. A point of no return for a vehicle may be defined as a point in time in which, with a given position, direction, and speed of the vehicle, the driver of the vehicle would be unable to softly stop before entering a danger zone. Soft braking may be defined as a braking in which the vehicle decelerates at less than a threshold (e.g., 0.3 g, where a G-force of 1 g is equal to the value of gravitational acceleration on Earth of 9.8 meters per second squared). Hard braking may be defined as a braking in which the vehicle decelerates at more than the threshold (e.g., 0.3 g). The threshold may be selected so that the deceleration is perceived as normal by a human driver. The threshold may be determined based on studies, but may be higher or lower according to preference. In some implementations, the forward facing camera 105 may determine whether the vehicle has reached the point of no return with respect to the set of danger zones according to the following formula:

$$\text{distance to danger zone} > \frac{\frac{1}{2}\ \text{vehicle speed}^2}{\text{soft braking threshold}}.$$

In some implementations, the forward facing camera 105 may determine, based on the location, the direction, and the speed of the vehicle, that the vehicle has reached the point of no return with respect to at least one danger zone of the set of danger zones. Alternatively, the forward facing camera 105 may determine, based on the location, the direction, and the speed of the vehicle, that the vehicle has not reached the point of no return with respect to the set of danger zones.

As further shown in FIG. 1B, and by reference number 140, the forward facing camera 105 may warn a driver of the vehicle about the set of danger zones based on determining that the vehicle has reached the point of no return. For example, when the forward facing camera 105 determines, based on the location, the direction, and the speed of the vehicle, that the vehicle has reached the point of no return with respect to at least one danger zone of the set of danger zones, the forward facing camera 105 may determine that the vehicle is unable to stop gently before entering the at least one danger zone. In such situations, the forward facing camera 105 may generate an alert that warns the driver that the vehicle has reached the point of no return. The alert may be an audible alert, a visual alert, a combination of an audible and visual alert, and/or the like and may instruct the driver to take immediate action (e.g., applying the brakes as soon as possible).

Figure 1C:
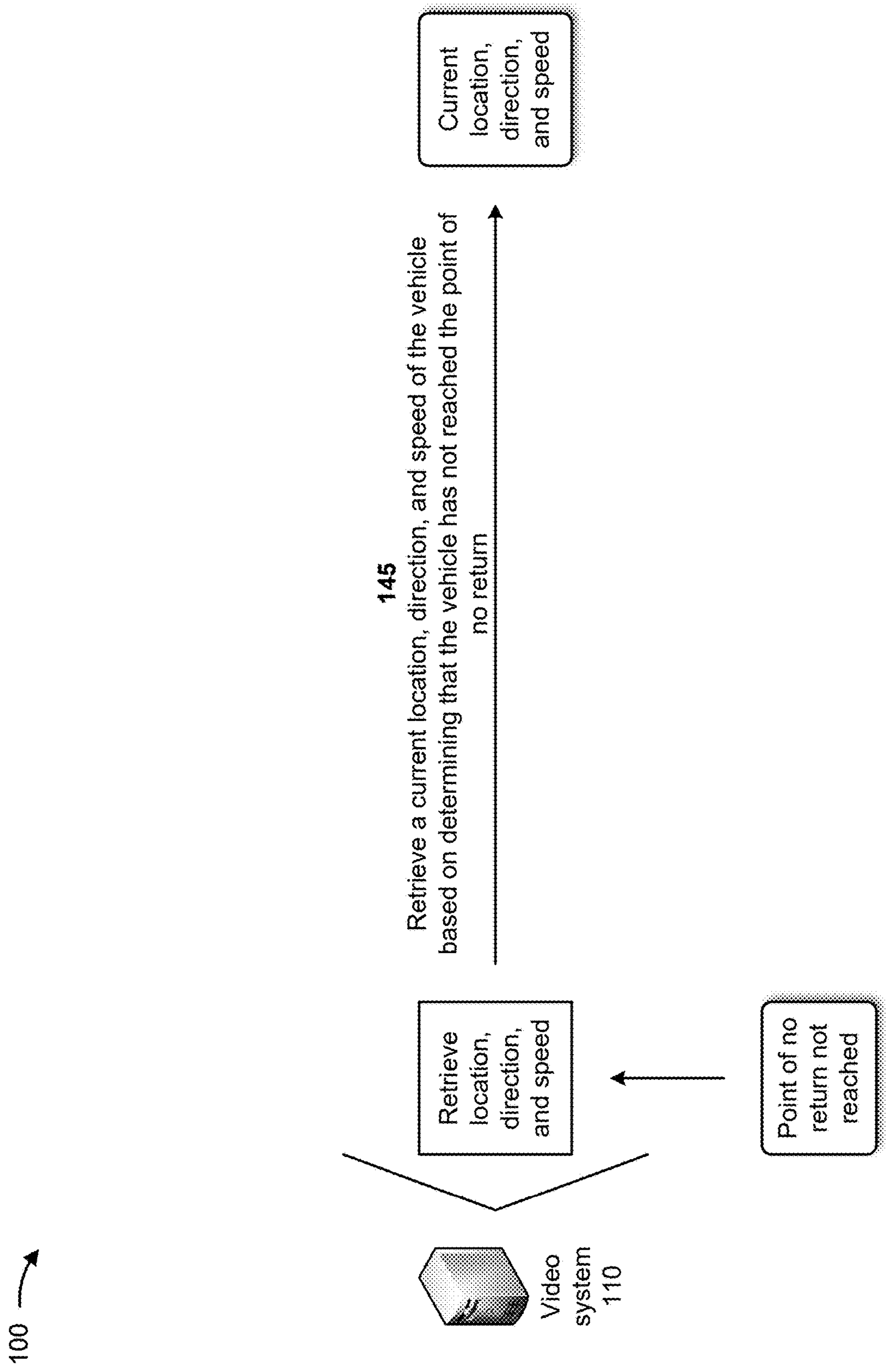

As shown in FIG. 1C, and by reference number 145, the forward facing camera 105 may retrieve a current location, direction, and speed of the vehicle based on determining that the vehicle has not reached the point of no return. For example, when the forward facing camera 105 determines, based on the location, the direction, and the speed of the vehicle, that the vehicle has not reached the point of no return, the forward facing camera 105 may receive (e.g., from the vehicle control system) the current location, direction, and speed of the vehicle for each video frame captured by the forward facing camera 105. In some implementations, the forward facing camera 105 may calculate the speed of the vehicle based on GPS positions of the vehicle over time.

Figure 1D:
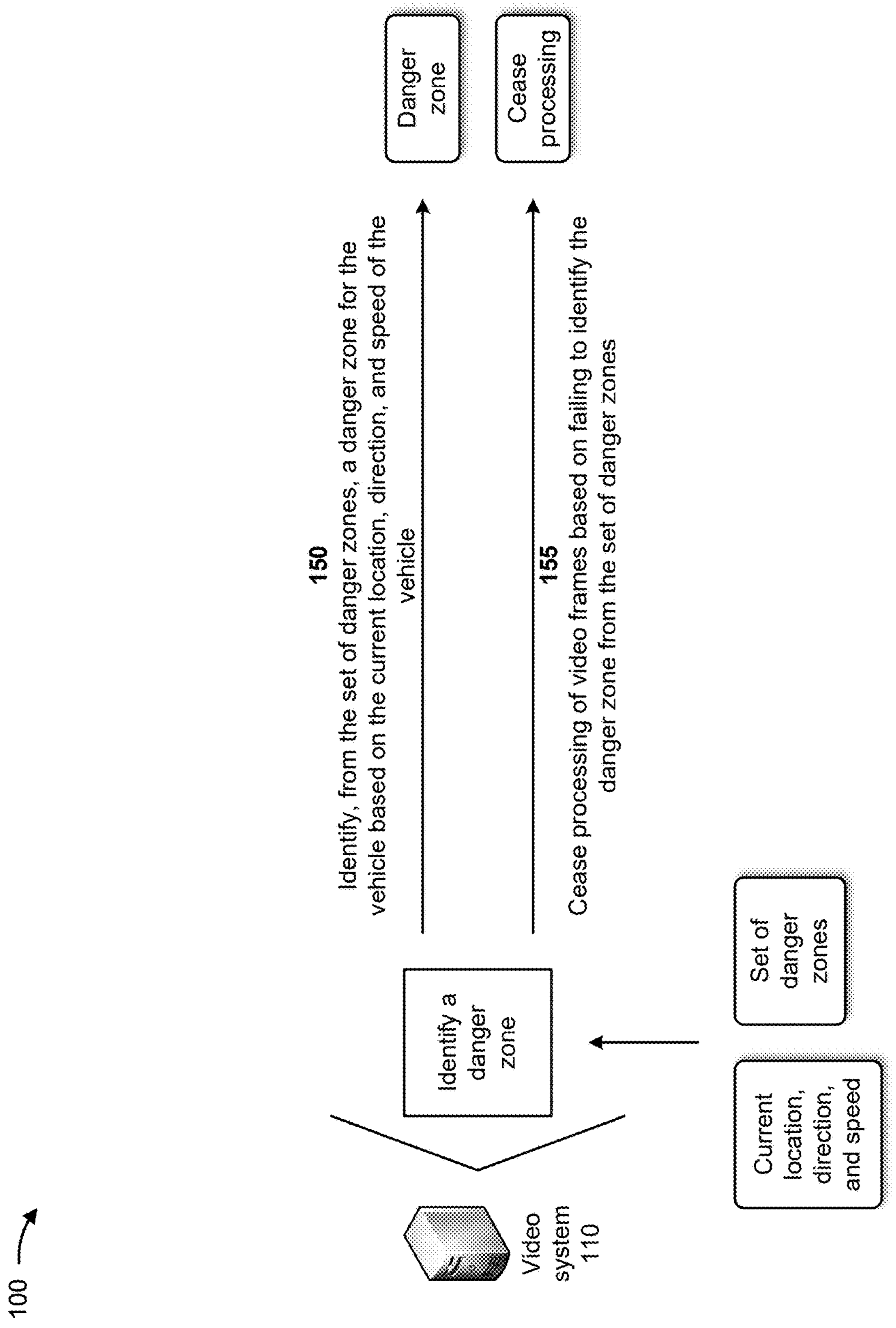

As shown in FIG. 1D, and by reference number 150, the forward facing camera 105 may identify, from the set of danger zones, a danger zone for the vehicle based on the current location, direction, and speed of the vehicle. For example, when identifying, from the set of danger zones, the danger zone for the vehicle based on the current location, direction, and speed of the vehicle, the forward facing camera 105 may exclude, from the set of danger zones, any danger zone that is not within a threshold distance of the current vehicle location (e.g., within two-hundred meters). In some implementations, when identifying, from the set of danger zones, the danger zone for the vehicle based on the current location, direction, and speed of the vehicle, the forward facing camera 105 may by comparing the current vehicle direction with an orientation of the danger zone. For example, the forward facing camera 105 may utilize a normalized scalar product of the vehicle's direction vector and the orientation of each danger zone to determine whether the vehicle is heading towards any particular danger zone (e.g., is less than a threshold value, such as 0.5), and may exclude, from the set of danger zones, danger zones that are not in a general direction of travel of the vehicle (e.g., heading towards the vehicle).

In some implementations, the forward facing camera 105 may exclude, from the set of danger zones, danger zones that include the current vehicle location or that have been recently crossed by the vehicle. For example, the forward facing camera 105 may maintain a history of recently crossed danger zones to prevent redundant checks and to focus computational efforts on danger zones that pose a potential risk of traffic signal violations. In some implementations, when identifying, from the set of danger zones, the danger zone for the vehicle based on the current location, direction, and speed of the vehicle, the forward facing camera 105 may identify the danger zone as a danger zone that is closest to the vehicle and is not excluded from the set of danger zones. In some implementations, the forward facing camera 105 may identify, from the set of danger zones, the danger zone for the vehicle based on the current location, direction, and speed of the vehicle. Alternatively, the forward facing camera 105 may fail to identify, from the set of danger zones, a danger zone for the vehicle based on the current location, direction, and speed of the vehicle.

As further shown in FIG. 1D, and by reference number 155, the forward facing camera 105 may, alternatively, cease processing of video frames based on failing to identify the danger zone from the set of danger zones. For example, when the forward facing camera 105 fails to identify, from the set of danger zones, a danger zone for the vehicle based on the current location, direction, and speed of the vehicle, the forward facing camera 105 may cease processing of video frames for danger zone calculations since the vehicle is safe (e.g., not about to run a traffic signal in a stopped state) and to conserve resources of the forward facing camera 105.

Figure 1E:
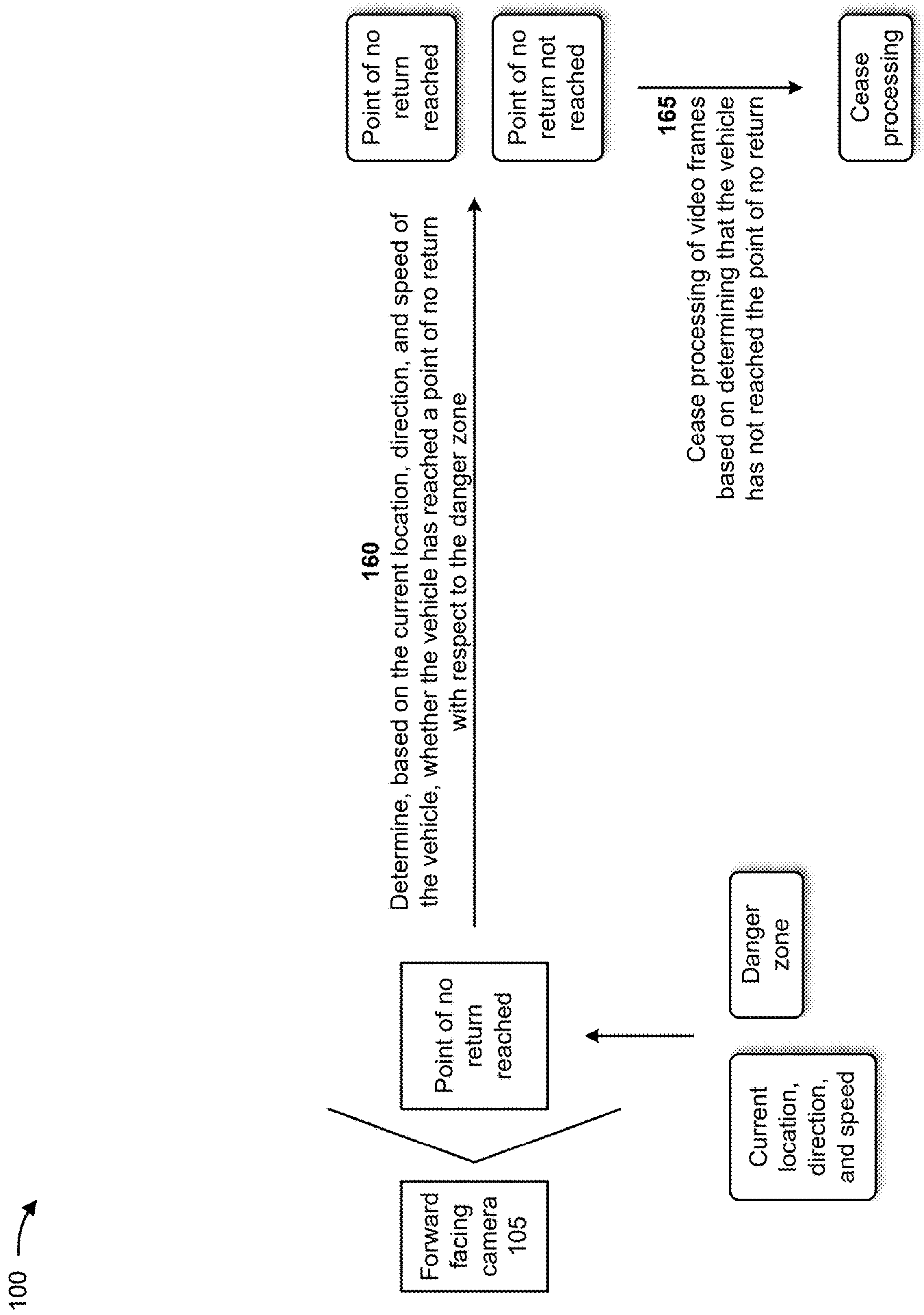

As shown in FIG. 1E, and by reference number 160, the forward facing camera 105 may determine, based on the current location, direction, and speed of the vehicle, whether the vehicle has reached a point of no return with respect to the danger zone. For example, when the forward facing camera 105 identifies, from the set of danger zones, the danger zone for the vehicle based on the current location, direction, and speed of the vehicle, the forward facing camera 105 may calculate a distance of the vehicle from the danger zone. The forward facing camera 105 may determine whether the vehicle has reached the point of no return with respect to the danger zone based on the current location, direction, and speed of the vehicle and based on the distance of the vehicle from the danger zone. In some implementations, the forward facing camera 105 may apply a kinematic model to determine whether the vehicle can safely decelerate to a stop before the danger zone (e.g., has not reached the point of no return with respect to the danger zone) or whether the vehicle has reached a point where hard braking is necessary to prevent a collision (e.g., has reached the point of no return with respect to the danger zone). In some implementations, the forward facing camera 105 may determine that the vehicle has reached the point of no return with respect to the danger zone. Alternatively, the forward facing camera 105 may determine that the vehicle has not reached the point of no return with respect to the danger zone.

As further shown in FIG. 1E, and by reference number 165, the forward facing camera 105 may cease processing of video frames based on determining that the vehicle has not reached the point of no return. For example, when the forward facing camera 105 determines that the vehicle has not reached the point of no return with respect to the danger zone, the forward facing camera 105 may cease processing of video frames for danger zone calculations since the vehicle is safe (e.g., not about to run a traffic signal in a stopped state) and to conserve resources of the forward facing camera 105.

Figure 1F:
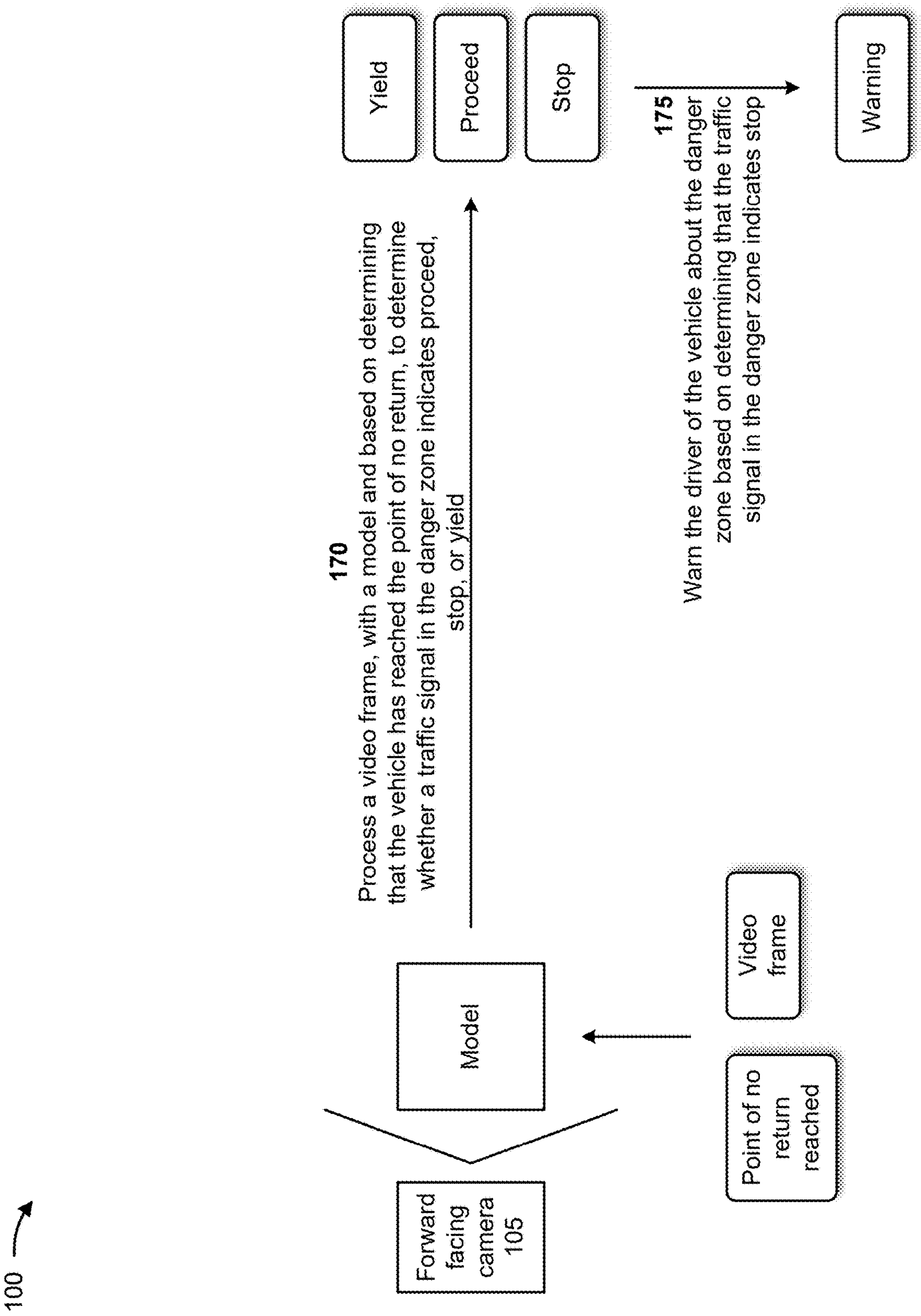

As shown in FIG. 1F, and by reference number 170, the forward facing camera 105 may process a video frame, with a model and based on determining that the vehicle has reached the point of no return, to determine whether a traffic signal in the danger zone indicates proceed, stop, or yield. For example, when the forward facing camera 105 determines that the vehicle has reached the point of no return with respect to the danger zone, the forward facing camera 105 may process a video frame, with a model (e.g., an artificial intelligence model), to determine whether a traffic signal in the danger zone indicates proceed, stop, or yield. In some implementations, the model may determine that the traffic signal in the danger zone indicates proceed. Alternatively, the model may determine that the traffic signal in the danger zone indicates stop or yield. In some implementations, the forward facing camera 105 may process a single video frame and may disable any further processing relative to the traffic signal. That way, instead of processing the traffic signal at every video frame, the forward facing camera 105 is processes at most one vide frame for every traffic signal, which is orders of magnitude less computationally expensive.

In some implementations, the forward facing camera 105 may process the video frame with the model multiple times to increase precision and to utilize very few resources compared to executing the model at high frequencies. In some implementations, the forward facing camera 105 may utilize different models, and may execute the different models on different video frames. For example, the forward facing camera 105 may initially utilize a lightweight model, and then utilize a more precise but computationally expensive model depending on what the lightweight model generated as results.

In some implementations, when processing the video frame to detect a state of a traffic light when the vehicle is past the point of no return, the forward facing camera 105 may condition the processing upon the vehicle's speed and distance indicating a necessity for hard braking to avoid entering the danger zone. For example, the forward facing camera 105 may activate the model to analyze the video frame and determine the traffic light state only when the vehicle's kinematic data suggests an imminent risk of running a red light. In some implementations, the forward facing camera 105 may disable further processing related to the detected traffic light after processing the video frame. For example, once the model has analyzed the video frame for a specific traffic light, the forward facing camera 105 may avoid redundant processing for that traffic light, conserving computational resources for other tasks.

As further shown in FIG. 1F, and by reference number 175, the forward facing camera 105 may warn the driver of the vehicle about the danger zone based on determining that the traffic signal in the danger zone indicates stop. For example, when the model determines that the traffic signal in the danger zone indicates stop or yield, the forward facing camera 105 may determine that the vehicle is unable to stop gently before entering the danger zone. In such situations, the forward facing camera 105 may generate an alert that warns the driver that the traffic signal in the danger zone indicates stop. The alert may be an audible alert, a visual alert, a combination of an audible and visual alert, and/or the like and may instruct the driver to take immediate action (e.g., applying the brakes as soon as possible).

Figure 1G:
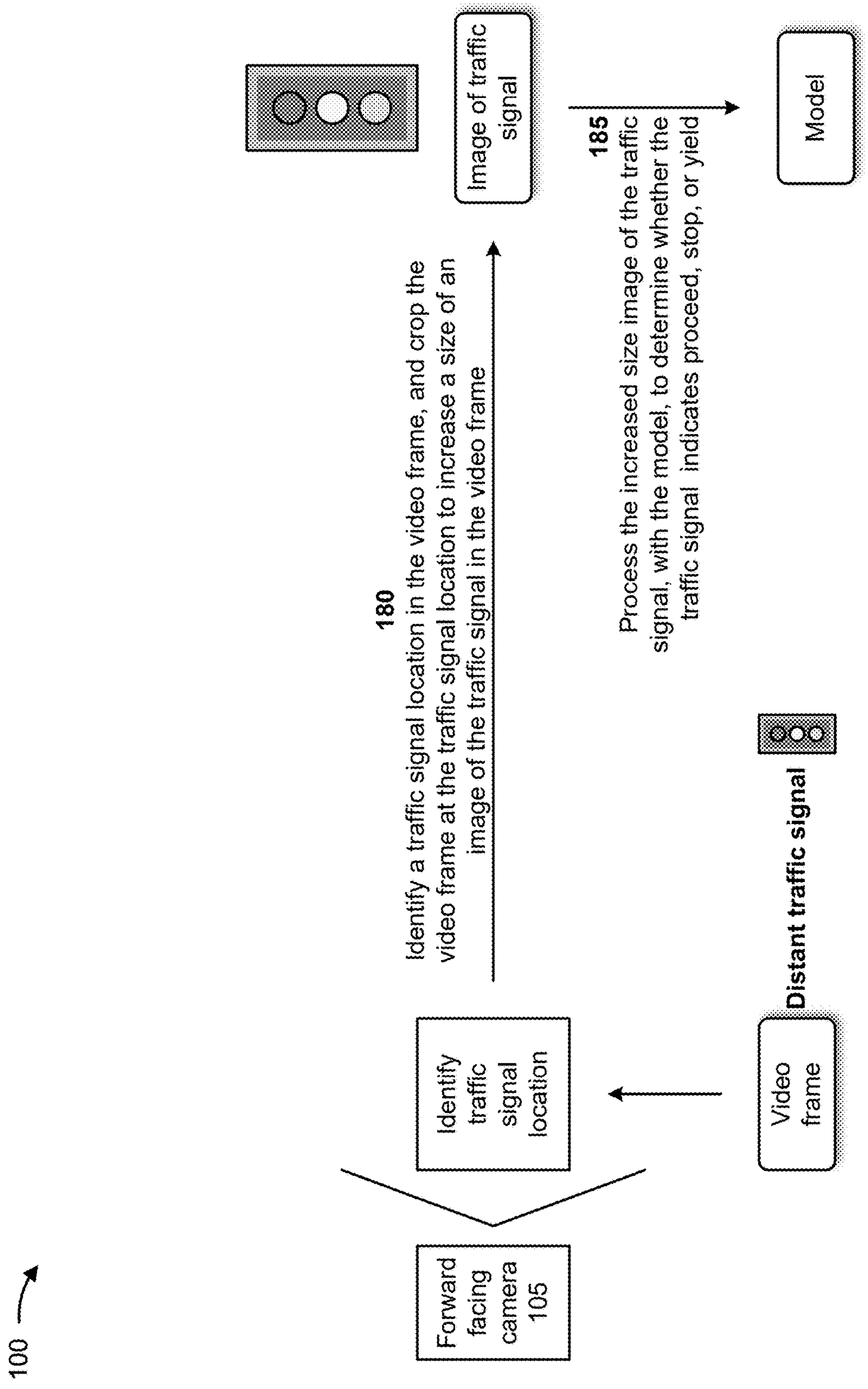

As shown in FIG. 1G, and by reference number 180, the forward facing camera 105 may identify a traffic signal location in the video frame, and crop the video frame at the traffic signal location to increase a size of an image of the traffic signal in the video frame. For example, when the traffic signal is located a relatively long distance from the vehicle (e.g., up to two-hundred meters), the forward facing camera 105 may face issues with the video frame. The forward facing camera 105 may have a wide field of view, making far objects extremely small, and images from the forward facing camera 105 may not be very crisp due to motion blur, a dirty lens, camera optics/sensors, and/or the like. Furthermore, even if the traffic signal is visible in the video frame, the forward facing camera 105 may not process the video frame at full resolution since it would be too computationally expensive and require several seconds (e.g., after the vehicle is past an intersection). In order to mitigate these issues, the forward facing camera 105 may resize the video frame to a lower resolution, so that a computation can be performed quickly. When the vehicle is rather far from the traffic signal (e.g., more than seventy meters), then the traffic signal in the video frame, once downscaled to the lower resolution, would be too small to be detected, since the video frame would only be a few pixels wide. The forward facing camera 105 may address this issue by determining, before analyzing the video frame, where in the video frame the traffic signal is located. Once this is done, instead of downscaling the vide frame, the forward facing camera 105 may crop the video frame at the location of the traffic signal, so that the image resolution can be kept low enough, but the traffic signal size within the video frame is kept large, and the model is able to properly detect the traffic signal.

In order to understand where the traffic signal is located within the video frame, the forward facing camera 105 may calculate a camera vanishing point, which is a point in which parallel lines along a forward direction of the vehicle converge. The forward facing camera 105 may periodically calculate (e.g., with a computer vision model or an artificial intelligence model) the camera vanishing point since the camera vanishing point does not change unless a position of the forward facing camera 105 within the vehicle is changed. The forward facing camera 105 may also calculate a current heading of the vehicle as an angle, a current vehicle GPS position, and a GPS position of the traffic signal corresponding to the danger zone. The forward facing camera 105 may also utilize or calculate a camera calibration matrix (e.g., a three-by-three matrix).

The forward facing camera 105 may determine an offset of the traffic signal along the horizontal axis on the video frame. Using the camera and traffic signal GPS positions, along with the current heading, the forward facing camera 105 may compute the traffic signal position relative to the forward facing camera 105 as x and z, where x is a coordinate along a left-right axis, and z is a coordinate along a forward-back axis. A y coordinate (e.g., a height) may be ignored since there is no information about traffic signal heights. In some implementations, the forward facing camera 105 may calculate x and z, based on v_lat, v_lon (e.g., the vehicle latitude and longitude) and t_lat, t_lon (e.g., the traffic signal latitude and longitude), by determining a distance (e.g., in meters) along the two coordinate axis using a linear approximation for geodesic distances:

$$diff\_x = (t\_lon - v\_lon) * \cos(v\_lat) * lat\_meters$$

$$diff\_z = (t\_lat - v\_lat) * lat\_meters,$$

where lat_meters is a number of meters in one earth latitude (e.g., 111,139).

The forward facing camera 105 may rotate the coordinates to align with the vehicle heading h, measured as the angle from the north direction, counterclockwise, obtaining the final x and z values required by the other steps:

$$x = diff\_x * \cos(h) - diff\_z * \sin(h)$$

$$z = diff\_x * \sin(h) + diff\_z * \cos(h).$$

Once the real world coordinates x and z have been computed, the forward facing camera 105 may translate the real world coordinates into pixel coordinates by multiplying the vector [x, 0, z] by the camera calibration matrix, to get the homogeneous coordinates [x_h, y_h, z_h]. The forward facing camera 105 may then compute a pixel offset along the horizontal axis by dividing x_h by z_y. Optionally, for additional precision, the forward facing camera 105 may correct the resulting coordinate for fisheye distortion. In order to do this, the camera fisheye distortion parameters are needed, which include of five numbers that can either be provided by the camera manufacturer or computed.

Once the pixel x offset is obtained, the forward facing camera 105 identify a portion of the video frame centered on such an offset. The forward facing camera 105 may scale the portion to an expected model resolution, regardless of a size of the original portion. When the forward facing camera 105 is far away from the traffic signal, the traffic signal will be small on the video frame, so the forward facing camera 105 may crop a small portion and zoom-in in order to allow the model to properly detect the traffic signal. When the forward facing camera 105 is close to the traffic signal, then positioning errors may significantly affect the area in which the traffic signal is displayed on the video frame, so the forward facing camera 105 may utilize a larger frame area. When the forward facing camera 105 is far away from the traffic signal, then a height of the area of the traffic signal may be determined. However, most of the traffic signals have the same height, which can be translated into a fixed number of pixels above the camera vanishing point. When the forward facing camera 105 is close to the traffic signal, there is more uncertainty about the actual image height, but precision is not as crucial since the forward facing camera 105 can utilize most of the video frame, scale the video frame down to the model resolution, and the traffic signal will be big enough to be detected by the model. To crop the video frame, the forward facing camera 105 may determine a cropped region width, a cropped region height, and a cropped region y offset (e.g., all of which depend on the distance to the traffic signal). Such a procedure may enable the forward facing camera 105 to easily detect traffic signals even if the traffic signals are far away, without having to use a significant amount of computing resources.

As further shown in FIG. 1G, and by reference number 185, the forward facing camera 105 may process the increased size image of the traffic signal, with the model, to determine whether the traffic signal indicates proceed, stop, or yield. For example, after manipulating the image of the traffic signal, as described above in connection with reference number 180, the forward facing camera 105 may process the increased size image of the traffic signal, with the model, to determine a state of the traffic signal (e.g., whether the traffic signal indicates proceed, stop, or yield). In some implementations, the model may determine that the traffic signal in the danger zone indicates proceed. Alternatively, the model may determine that the traffic signal in the danger zone indicates stop or yield.

Figure 1H:
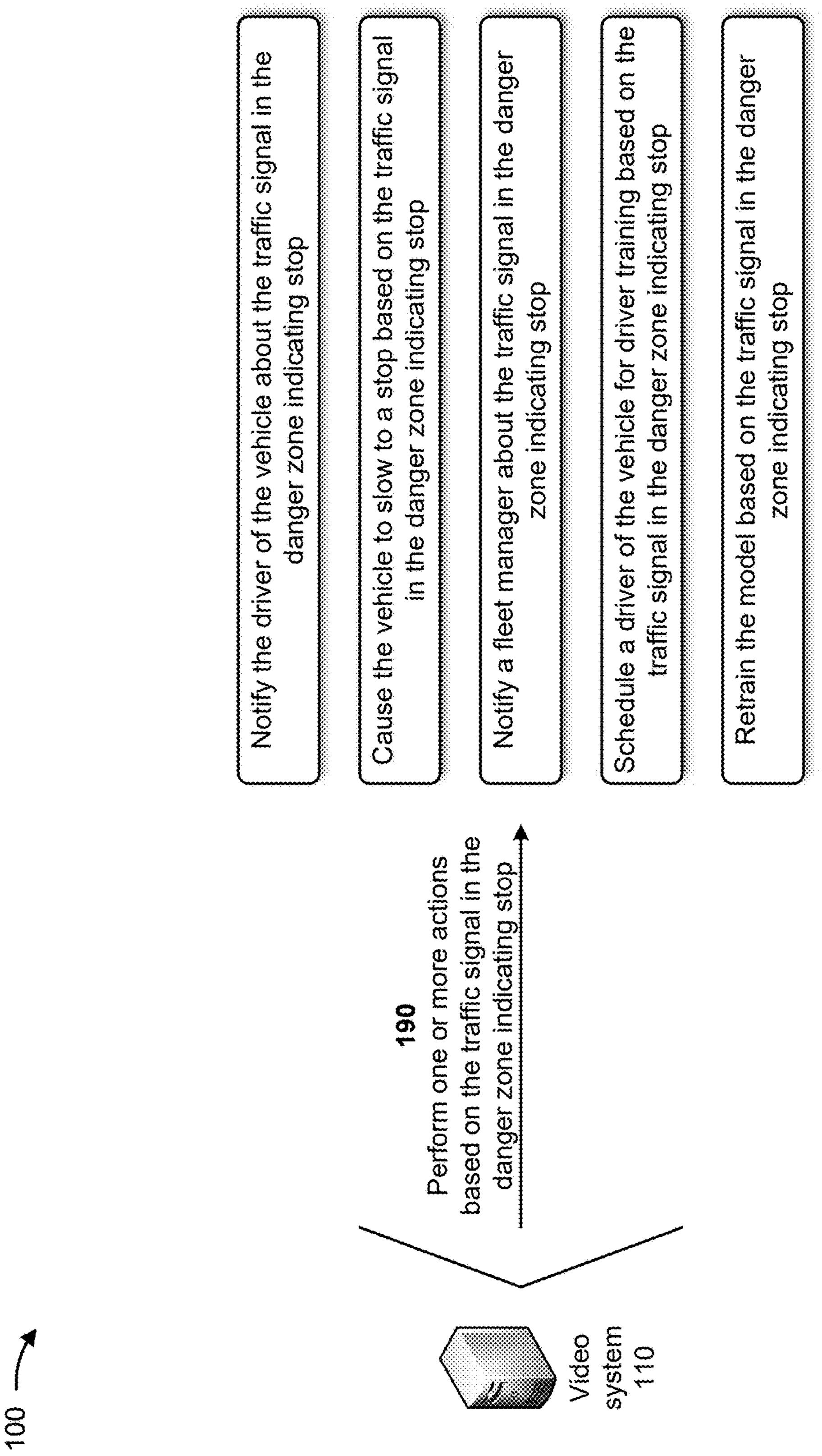

As shown in FIG. 1H, and by reference number 190, the forward facing camera 105 may perform one or more actions based on the traffic signal in the danger zone indicating stop. In some implementations, performing the one or more actions includes the video system 110 notifying a driver of the vehicle about the traffic signal in the danger zone indicating stop. For example, when the forward facing camera 105 detects the traffic signal in the danger zone indicates stop, the forward facing camera 105 may generate a notification identifying the traffic signal in the danger zone indicating stop. The forward facing camera 105 may provide the notification to the vehicle, and the vehicle may provide (e.g., display, audibly provide, and/or the like) the notification to the driver of the vehicle. In this way, the video system 110 conserves computing resources, networking resources, and/or other resources that would have otherwise been consumed by failing to provide accurate traffic violation detections.

In some implementations, performing the one or more actions includes the forward facing camera 105 causing the vehicle to slow to a stop based on the traffic signal in the danger zone indicating stop. For example, when the forward facing camera 105 detects the traffic signal in the danger zone indicates stop, the forward facing camera 105 may generate driving instructions to slow the vehicle to a stop. The forward facing camera 105 may provide the driving instructions to the vehicle to cause the vehicle to slow to a stop. In this way, the video system 110 conserves computing resources, networking resources, and/or other resources that would have otherwise been consumed by erroneously manipulating the vehicle based on inaccurate traffic violation detections.

In some implementations, performing the one or more actions includes the forward facing camera 105 notifying a fleet manager about the traffic signal in the danger zone indicating stop. For example, when the forward facing camera 105 detects the traffic signal in the danger zone indicates stop, the forward facing camera 105 may generate a notification identifying the traffic signal in the danger zone indicating stop. The forward facing camera 105 may provide the notification to a user device associated with a fleet manager of the vehicle. The user device may provide (e.g., display, audibly provide, and/or the like) the notification to the fleet manager and the fleet manager may discuss the issue with the driver of the vehicle. In this way, the video system 110 conserves computing resources, networking resources, and/or other resources that would have otherwise been consumed by failing to provide accurate traffic violation detections.

In some implementations, performing the one or more actions includes the forward facing camera 105 scheduling a driver of the vehicle for driver training based on the traffic signal in the danger zone indicating stop. For example, when the forward facing camera 105 detects the traffic signal in the danger zone indicates stop, the forward facing camera 105 may determine that the driver of the vehicle needs training (e.g., defensive driving lessons) in order to improve the driver's driving. The forward facing camera 105 may schedule the driver for driver training and may inform the driver about the scheduled driver training. In this way, the video system 110 conserves computing resources, networking resources, and/or other resources that would have otherwise been consumed by failing to provide timely warnings associated with traffic violation detections.

In some implementations, performing the one or more actions includes the forward facing camera 105 retraining the model based on the traffic signal in the danger zone indicating stop. For example, the forward facing camera 105 may utilize the traffic signal in the danger zone indicating stop as additional training data for retraining the model, thereby increasing the quantity of training data available for training the model. Accordingly, the forward facing camera 105 may conserve computing resources associated with identifying, obtaining, and/or generating historical data for training the model relative to other systems for identifying, obtaining, and/or generating historical data for training machine learning models.

Thus, the forward facing camera 105 may reduce an execution frequency of the traffic signal classifier, which may enhance the accuracy of the traffic signal classifier. The forward facing camera 105 may utilize deceleration thresholds and kinematics principles to detect and preemptively prevent traffic signal violations, allowing drivers to apply the brakes to stop in time or at least to mitigate the impact of potential accidents. The forward facing camera 105 may promptly warn a driver but may utilize very few computational resources. The forward facing camera 105 may provide an audio warning to the driver so that the drive may respond accordingly (e.g., by applying the brakes) before a dangerous event occurs (e.g., running a red light). In a commercial setting, the forward facing camera 105 may collect instances of unsafe driving that can be sent to a fleet management system so that a fleet manager may address a driver's unsafe tactics. In some implementations, the forward facing camera 105 may predict instances where a vehicle will travel through a traffic signal in a stop state (e.g., a red light) with a significant speed. The forward facing camera 105 may perform this prediction by detecting the relevant traffic signal for the vehicle, determining a state of the traffic signal (e.g., proceed (green light), stop (red light), or yield (yellow light or flashing yellow light)), and triggering a possible violation prior to occurrence of the violation (e.g., with as few resources as possible).

In this way, the forward facing camera 105 detects traffic signal violations associated with the vehicle. For example, the forward facing camera 105 may determine whether a vehicle has passed a point of no return with respect to a danger zone based on the vehicle's speed, direction, and distance to the danger zone, and may process a video frame to determine a state of a traffic signal when the vehicle is past the point of no return. The forward facing camera 105 may alert a driver when a red traffic signal is detected and the vehicle is past the point of no return. The forward facing camera 105 may efficiently utilize computational resources by employing conditional processing of video camera frames, preemptive calculations of danger zones, and minimal continuous high-frame-rate processing. The forward facing camera 105 may utilize selective video frame processing and a spatial data structure for danger zone retrieval to optimize performance and to ensure that computational resources are utilized only when there is a high probability of a traffic violation. Thus, the forward facing camera 105 may conserve computing resources, networking resources, and/or other resources that would have otherwise been consumed by failing to provide accurate traffic violation detections, erroneously warning a driver of the vehicle based on inaccurate traffic violation detections, failing to provide timely warnings associated with traffic violation detections, erroneously manipulating the vehicle based on inaccurate traffic violation detections, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
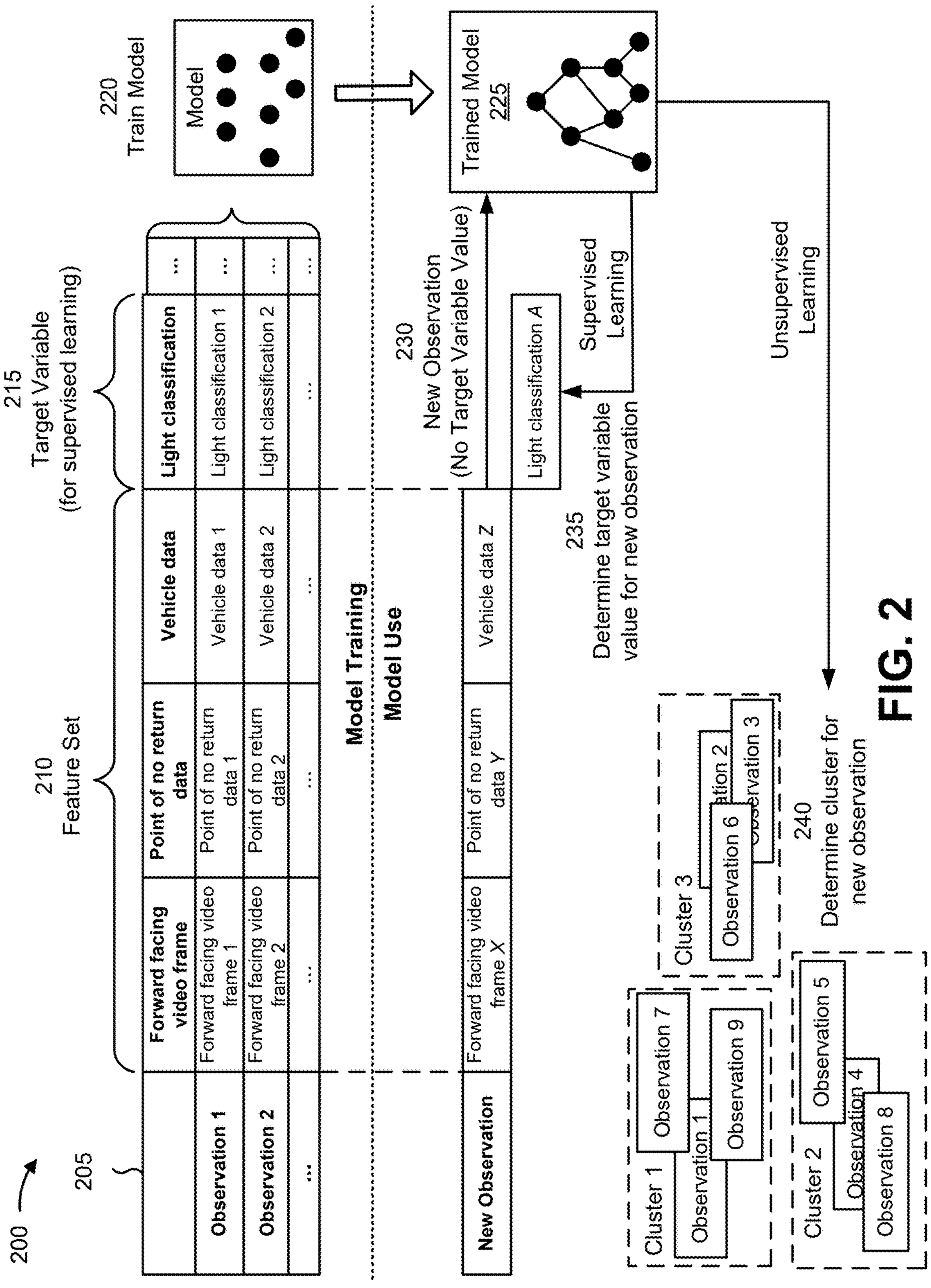
FIG. 2 is a diagram illustrating an example of training and using a machine learning model.

FIG. 2 is a diagram illustrating an example 200 of training and using a machine learning model for detecting traffic signal violations. The machine learning model training and usage described herein may be performed using a machine learning system. The machine learning system may include or may be included in a computing device, a server, a cloud computing environment, and/or the like, such as the forward facing camera 105 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the forward facing camera 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the forward facing camera 105. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a forward facing video frame, a second feature of point of no return data, a third feature of vehicle data, and so on. As shown, for a first observation, the first feature may have a value of forward facing video frame 1, the second feature may have a value of point of no return data 1, the third feature may have a value of vehicle data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "light classification" and may include a value of light classification 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of forward facing video frame X, a second feature of point of no return data Y, a third feature of vehicle data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of light classification A for the target variable of the lane lines and classifications for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a forward facing video frame cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a point of no return data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect traffic signal violations. The machine learning system enables recognition and/or identification of tens, hundreds, thousands, or millions of features and/or feature values for tens, hundreds, thousands, or millions of observations, thereby increasing accuracy and consistency and reducing delay associated with detecting traffic signal violations relative to requiring computing resources to be allocated for tens, hundreds, or thousands of operators to manually detect traffic signal violations.

As indicated above, FIG. 2 is provided as an example. Other examples may differ from what is described in connection with FIG. 2.

Figure 3:
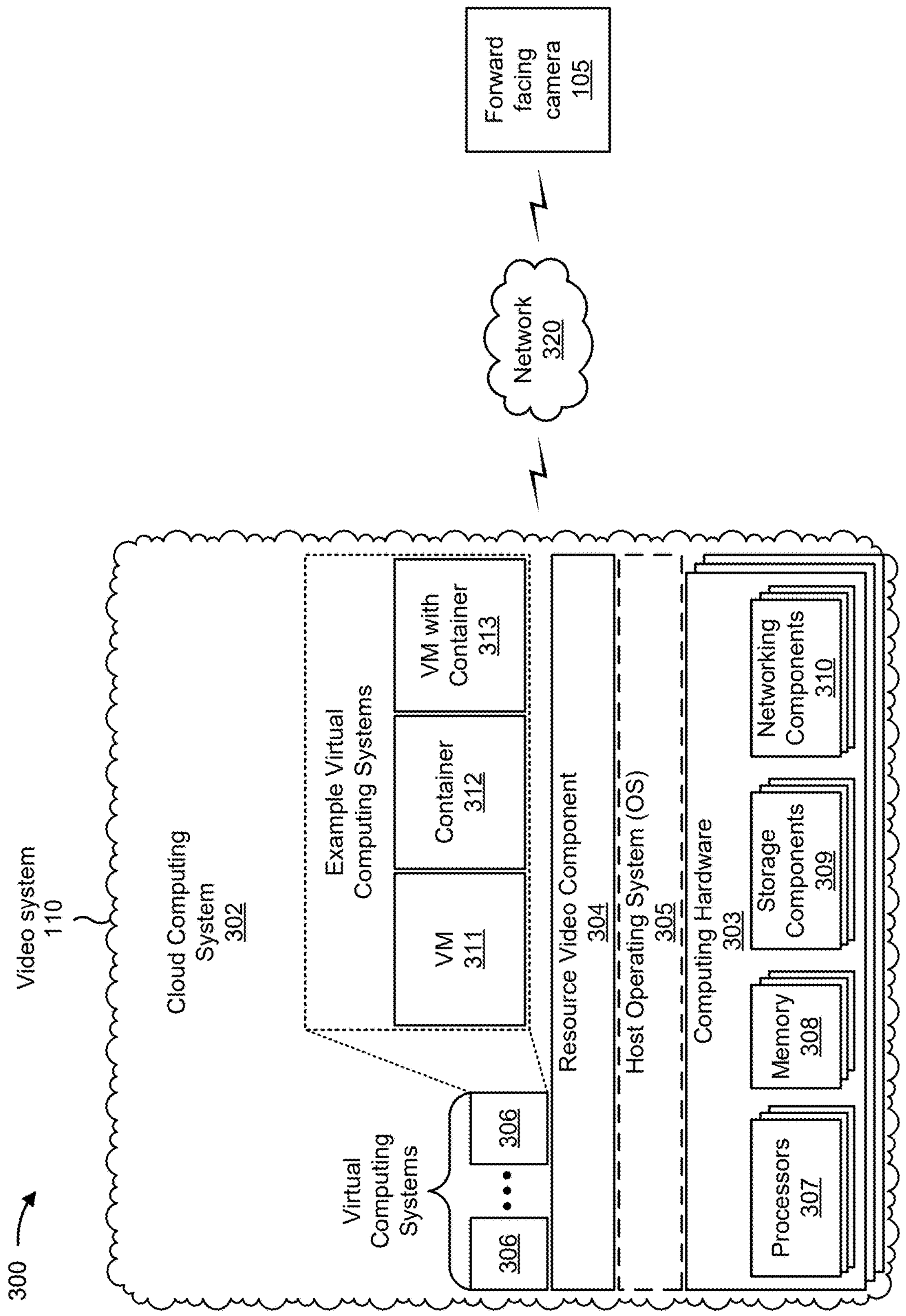
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 110, which may include one or more elements of and/or may execute within a cloud computing system 302. The cloud computing system 302 may include one or more elements 303-313, as described in more detail below. As further shown in FIG. 3, the environment 300 may include the forward facing camera 105 and/or a network 320. Devices and/or elements of the environment 300 may interconnect via wired connections and/or wireless connections.

The forward facing camera 105 may include one or more devices capable of receiving, generating, storing, processing, providing, and/or routing information, as described elsewhere herein. The forward facing camera 105 may include a communication device and/or a computing device. For example, the forward facing camera 105 may include an optical instrument that captures videos (e.g., images and audio). The forward facing camera 105 may feed real-time video directly to a screen or a computing device for immediate observation, may record the captured video (e.g., images and audio) to a storage device for archiving or further processing, and/or the like. In some implementations, the forward facing camera 105 may include a dashcam of a vehicle.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 110 may include one or more elements 303-313 of the cloud computing system 302, may execute within the cloud computing system 302, and/or may be hosted within the cloud computing system 302, in some implementations, the video system 110 may not be cloud-based (e.g., may be implemented outside of a cloud computing system) or may be partially cloud-based. For example, the video system 110 may include one or more devices that are not part of the cloud computing system 302, such as a device 400 of FIG. 4, which may include a standalone server or another type of computing device. The video system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
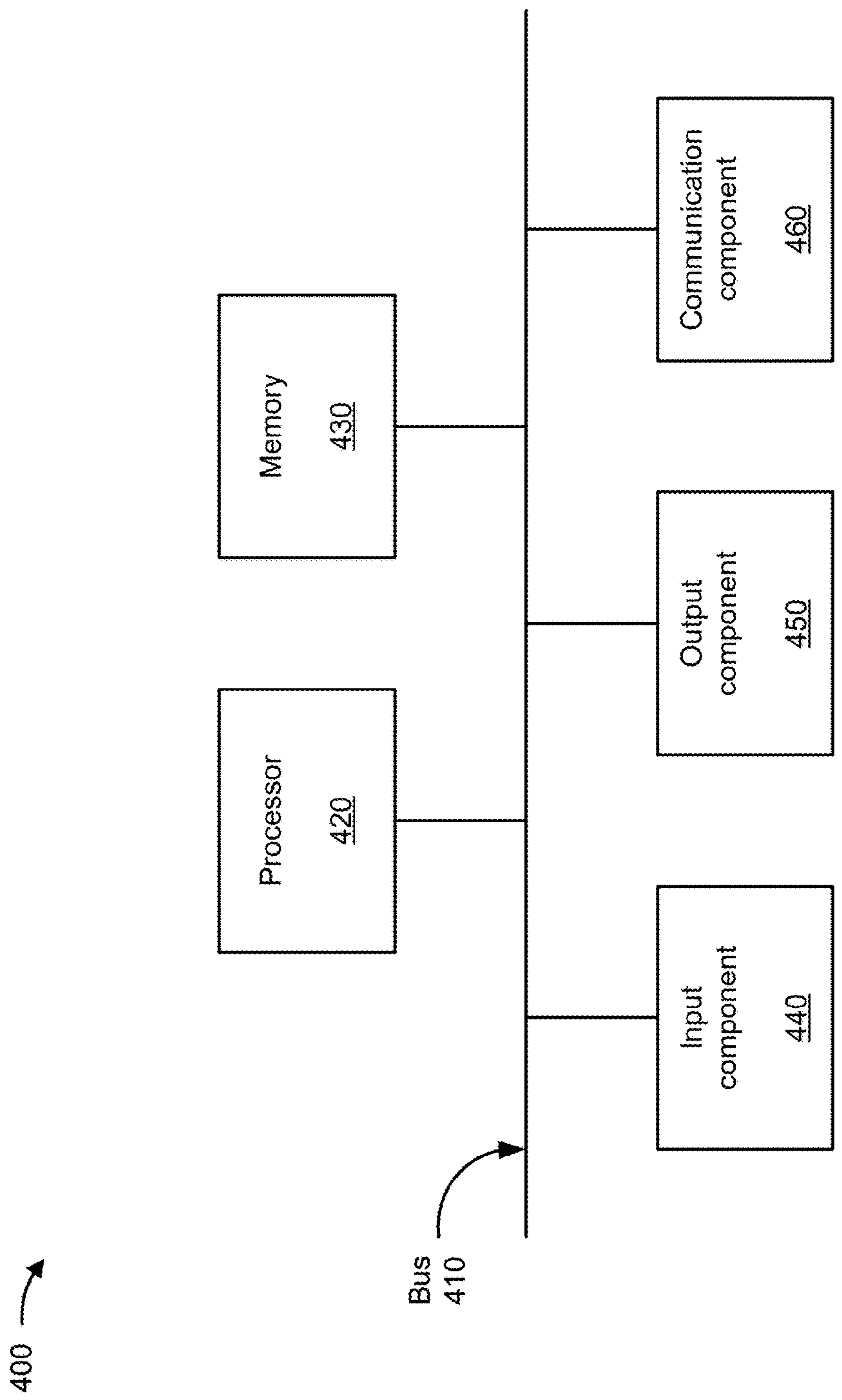
FIG. 4 is a diagram of example components of one or more devices of FIG. 3.

FIG. 4 is a diagram of example components of a device 400, which may correspond to the forward facing camera 105 and/or the video system 110. In some implementations, the forward facing camera 105 and/or the video system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications)

related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
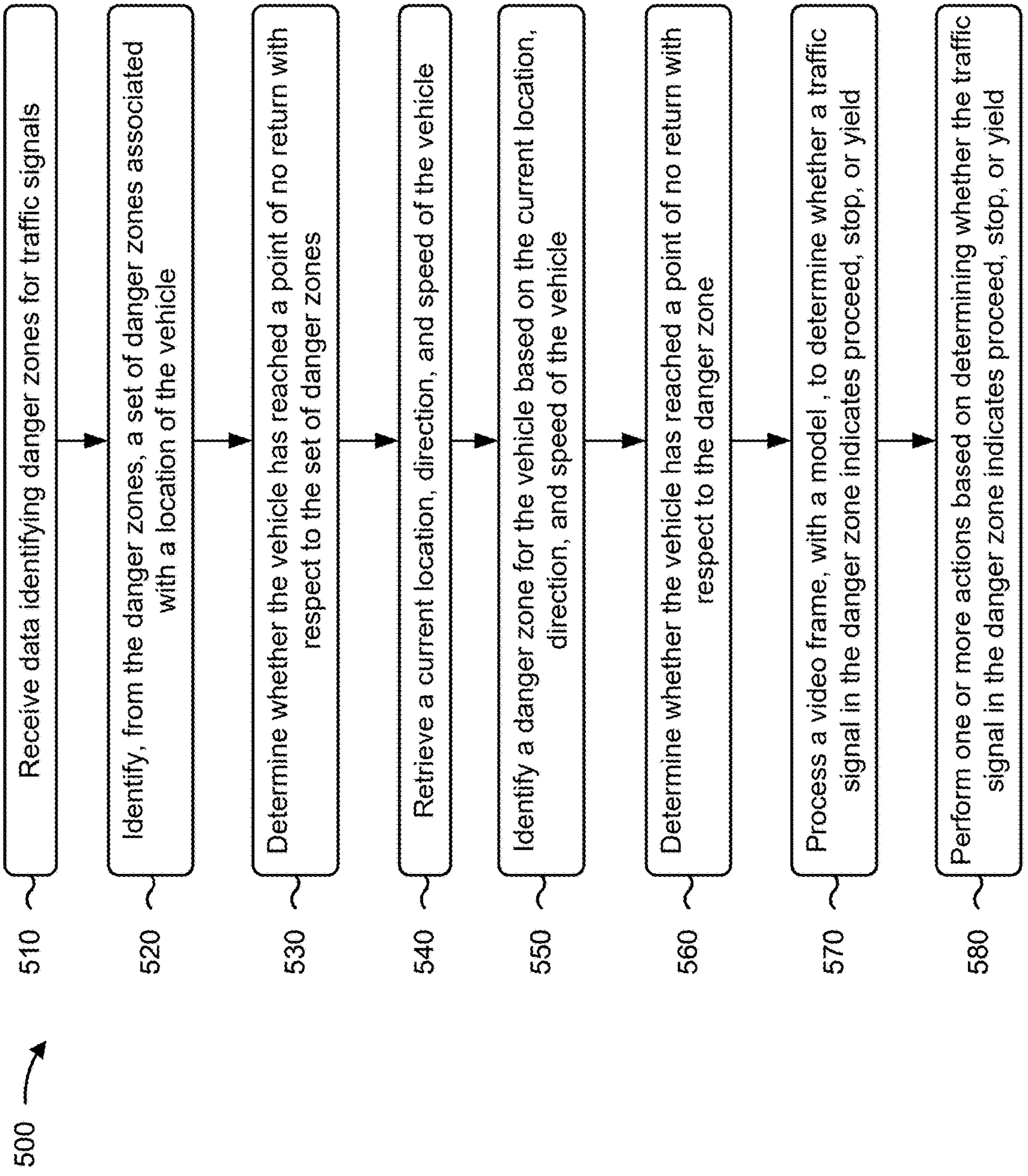
FIG. 5 is a flowchart of an example process for detecting traffic signal violations with a forward facing camera of a vehicle.

FIG. 5 depicts a flowchart of an example process 500 for detecting traffic signal violations associated with vehicle. In some implementations, one or more process blocks of FIG. 5 may be performed by a device (e.g., the forward facing camera 105). In some implementations, one or more process blocks of FIG. 5 may be performed by another device or a group of devices separate from or including the device, such as a control system of the vehicle, a video system (e.g., the video system 110), and/or the like. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving data identifying danger zones for traffic signals (block 510). For example, the device may receive data identifying danger zones for traffic signals in a geographical region of the vehicle, as described above.

As further shown in FIG. 5, process 500 may include identifying, from the danger zones, a set of danger zones associated with a location of the vehicle (block 520). For example, the device may identify, from the danger zones, a set of danger zones associated with a location of the vehicle, as described above. In some implementations, the set of danger zones are located a predetermined distance from the location of the vehicle.

As further shown in FIG. 5, process 500 may include determining whether the vehicle has reached a point of no return with respect to the set of danger zones (block 530). For example, the device may determine, based on the location, a direction, and a speed of the vehicle, whether the vehicle has reached a point of no return with respect to the set of danger zones, as described above.

As further shown in FIG. 5, process 500 may include retrieving a current location, direction, and speed of the vehicle (block 540). For example, the device may retrieve a current location, direction, and speed of the vehicle based on determining that the vehicle has not reached the point of no return with respect to the set of danger zones, as described above.

As further shown in FIG. 5, process 500 may include identifying a danger zone for the vehicle based on the current location, direction, and speed of the vehicle (block 550). For example, the device may identify, from the set of danger zones, a danger zone for the vehicle based on the current location, direction, and speed of the vehicle, as described above. In some implementations, identifying the danger zone for the vehicle based on the current location, direction, and speed of the vehicle includes comparing the current direction of the vehicle with an orientation of the danger zone, and identifying the danger zone for the vehicle based on comparing the current direction of the vehicle with the orientation of the danger zone. In some implementations, identifying, from the set of danger zones, the danger zone for the vehicle based on the current location, direction, and speed of the vehicle includes excluding, from the set of danger zones, one or more danger zones not associated with the current direction of the vehicle or that have been recently crossed by the vehicle, and identifying the danger zone for the vehicle based on excluding the one or more danger zones from the set of danger zones.

As further shown in FIG. 5, process 500 may include determining whether the vehicle has reached a point of no return with respect to the danger zone (block 560). For example, the device may determine, based on the current location, direction, and speed of the vehicle, whether the vehicle has reached a point of no return with respect to the danger zone, as described above.

As further shown in FIG. 5, process 500 may include processing a video frame, with a model, to determine whether a traffic signal in the danger zone indicates proceed, stop, or yield (block 570). For example, the device may process a video frame, with a model and based on determining that the vehicle has reached the point of no return with respect to the danger zone, to determine whether a traffic signal in the danger zone indicates proceed, stop, or yield, as described above. In some implementations, processing the video frame, with the model, to determine whether a traffic signal in the danger zone indicates proceed, stop, or yield includes identifying a traffic signal location in the video frame, cropping the video frame at the traffic signal location to increase a size of an image of the traffic signal in the video frame, and processing the increased size image of the traffic signal, with the model, to determine whether the traffic signal indicates proceed, stop, or yield.

As further shown in FIG. 5, process 500 may include performing one or more actions based on determining whether the traffic signal in the danger zone indicates proceed, stop, or yield (block 580). For example, the device may perform one or more actions based on determining whether the traffic signal in the danger zone indicates proceed, stop, or yield, as described above. In some implementations, performing the one or more actions includes one or more of ceasing processing of video frames based on determining that the traffic signal in the danger zone indicates proceed, or warning a driver of the vehicle about the danger zone based on determining that the traffic signal in the danger zone indicates stop. In some implementations, performing the one or more actions includes one or more of notifying a driver of the vehicle about the traffic signal based on determining that the traffic signal in the danger zone indicates stop, causing the vehicle to slow to a stop based on determining that the traffic signal in the danger zone indicates stop, or notifying a fleet manager about the traffic signal based on determining that the traffic signal in the danger zone indicates stop. In some implementations, performing the one or more actions includes one or more of scheduling a driver of the vehicle for driver training based on determining that the traffic signal in the danger zone indicates stop, or retraining the model based on determining that the traffic signal in the danger zone indicates stop.

In some implementations, process 500 includes storing the data identifying the danger zones in a spatial data structure. In some implementations, process 500 includes disabling further processing related to the traffic signal after performing the one or more actions. In some implementations, process 500 includes scaling a portion of the video frame centered on an estimated location of the traffic signal to maintain image resolution while reducing computational load.

In some implementations, process 500 includes adjusting a video frame processing frequency based on a proximity of the vehicle to the danger zone and prior to processing the video frame with the model. In some implementations, process 500 includes utilizing a calibration matrix to translate real-world coordinates of the traffic signal into pixel coordinates within the video frame prior to processing the video frame with the model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device associated with a vehicle, data identifying danger zones for traffic signals in a geographical region of the vehicle;

identifying, by the device and from the danger zones, a set of danger zones associated with a location of the vehicle;

determining, by the device and based on the location, a direction, and a speed of the vehicle, whether the vehicle has reached a point of no return with respect to the set of danger zones;

retrieving, by the device, a current location, direction, and speed of the vehicle based on determining that the vehicle has not reached the point of no return with respect to the set of danger zones;

identifying, by the device and from the set of danger zones, a danger zone for the vehicle based on the current location, direction, and speed of the vehicle;

determining, by the device and based on the current location, direction, and speed of the vehicle, whether the vehicle has reached a point of no return with respect to the danger zone;

processing, by the device, a video frame, with a model and based on determining that the vehicle has reached the point of no return with respect to the danger zone, to determine whether a traffic signal in the danger zone indicates proceed, stop, or yield;

ceasing, by the device, video frame processing based on determining that the vehicle has not reached the point of no return with respect to the danger zone; and performing, by the device, one or more actions based on determining whether the traffic signal in the danger zone indicates proceed, stop, or yield, wherein the one or more actions comprise:

ceasing, by the device, video frame processing based on determining that the traffic signal in the danger zone indicates proceed.

2. The method of claim 1, further comprising:

adjusting a video frame processing frequency based on a proximity of the vehicle to the danger zone and prior to processing the video frame with the model.

3. The method of claim 1, wherein processing the video frame, with the model, to determine whether the traffic signal in the danger zone indicates proceed, stop, or yield comprises:

identifying a traffic signal location in the video frame;

cropping the video frame at the traffic signal location to increase a size of an image of the traffic signal in the video frame; and processing the increased size image of the traffic signal, with the model, to determine whether the traffic signal indicates proceed, stop, or yield.

4. The method of claim 1, wherein the set of danger zones are located at a predetermined distance from the location of the vehicle.

5. The method of claim 1, further comprising:

disabling further processing related to the traffic signal after performing the one or more actions.

6. The method of claim 1, further comprising:

scaling a portion of the video frame centered on an estimated location of the traffic signal to maintain image resolution while reducing computational load.

7. The method of claim 1, wherein identifying the danger zone for the vehicle based on the current location, direction, and speed of the vehicle comprises:

comparing the current direction of the vehicle with an orientation of the danger zone; and identifying the danger zone for the vehicle based on comparing the current direction of the vehicle with the orientation of the danger zone.

8. A device, comprising:

one or more processors configured to:

receive data identifying danger zones for traffic signals in a geographical region of a vehicle;

store the data identifying the danger zones in a spatial data structure;

identify, from the danger zones, a set of danger zones associated with a location of the vehicle;

determine, based on the location, a direction, and a speed of the vehicle, whether the vehicle has reached a point of no return with respect to the set of danger zones;

retrieve a current location, direction, and speed of the vehicle based on determining that the vehicle has not reached the point of no return with respect to the set of danger zones;

identify, from the set of danger zones, a danger zone for the vehicle based on the current location, direction, and speed of the vehicle;

determine, based on the current location, direction, and speed of the vehicle, whether the vehicle has reached a point of no return with respect to the danger zone;

process a video frame, with a model and based on determining that the vehicle has reached the point of no return with respect to the danger zone, to determine whether a traffic signal in the danger zone indicates proceed, stop, or yield;

cease video frame processing based on determining that the vehicle has not reached the point of no return with respect to the danger zone; and perform one or more actions based on determining whether the traffic signal in the danger zone indicates proceed, stop, or yield, wherein the one or more actions comprise:

cease video frame processing based on determining that the traffic signal in the danger zone indicates proceed.

9. The device of claim 8, wherein the one or more processors, to identify, from the set of danger zones, the danger zone for the vehicle based on the current location, direction, and speed of the vehicle, are configured to:

exclude, from the set of danger zones, one or more danger zones not associated with the current direction of the vehicle or that have been recently crossed by the vehicle; and identify the danger zone for the vehicle based on excluding the one or more danger zones from the set of danger zones.

10. The device of claim 8, wherein the one or more processors are further configured to:

adjust a video frame processing frequency based on a proximity of the vehicle to the danger zone and prior to processing the video frame with the model.

11. The device of claim 8, wherein the one or more processors are further configured to:

utilize a calibration matrix to translate real-world coordinates of the traffic signal into pixel coordinates within the video frame prior to processing the video frame with the model.

12. The device of claim 8, wherein the one or more processors, to perform the one or more actions, are configured to:

warn a driver of the vehicle about the danger zone based on determining that the traffic signal in the danger zone indicates stop.

13. The device of claim 8, wherein the one or more processors, to perform the one or more actions, are configured to one or more of:

notify a driver of the vehicle about the traffic signal based on determining that the traffic signal in the danger zone indicates stop;

cause the vehicle to slow to a stop based on determining that the traffic signal in the danger zone indicates stop; or notify a fleet manager about the traffic signal based on determining that the traffic signal in the danger zone indicates stop.

14. The device of claim 8, wherein the one or more processors, to perform the one or more actions, are configured to one or more of:

schedule a driver of the vehicle for driver training based on determining that the traffic signal in the danger zone indicates stop; or retrain the model based on determining that the traffic signal in the danger zone indicates stop.

15. A non-transitory computer-readable medium storing a set of instructions, the set of instructions comprising:

one or more instructions that, when executed by one or more processors of a device, cause the device to:

receive data identifying danger zones for traffic signals in a geographical region of a vehicle;

identify, from the danger zones, a set of danger zones associated with a location of the vehicle;

determine, based on the location, a direction, and a speed of the vehicle, whether the vehicle has reached a point of no return with respect to the set of danger zones;

retrieve a current location, direction, and speed of the vehicle based on determining that the vehicle has not reached the point of no return with respect to the set of danger zones;

identify, from the set of danger zones, a danger zone for the vehicle based on the current location, direction, and speed of the vehicle;

determine, based on the current location, direction, and speed of the vehicle, whether the vehicle has reached a point of no return with respect to the danger zone;

process a video frame, with a model and based on determining that the vehicle has reached the point of no return with respect to the danger zone, to determine whether a traffic signal in the danger zone indicates proceed, stop, or yield;

cease video frame processing based on determining that the vehicle has not reached the point of no return with respect to the danger zone; and perform one or more actions based on determining whether the traffic signal in the danger zone indicates proceed, stop, or yield, wherein the one or more actions comprise:

cease video frame processing based on determining that the traffic signal in the danger zone indicates proceed.

16. The non-transitory computer-readable medium of claim 15, wherein the one or more instructions, that cause the device to process the video frame, with the model, to determine whether the traffic signal in the danger zone indicates proceed, stop, or yield, cause the device to:

identify a traffic signal location in the video frame;

crop the video frame at the traffic signal location to increase a size of an image of the traffic signal in the video frame; and process the increased size image of the traffic signal, with the model, to determine whether the traffic signal indicates proceed, stop, or yield.

17. The non-transitory computer-readable medium of claim 15, wherein the one or more instructions further cause the device to:

scale a portion of the video frame centered on an estimated location of the traffic signal to maintain image resolution while reducing computational load.

18. The non-transitory computer-readable medium of claim 15, wherein the one or more instructions, that cause the device to identify the danger zone for the vehicle based on the current location, direction, and speed of the vehicle, cause the device to:

compare the current direction of the vehicle with an orientation of the danger zone; and identify the danger zone for the vehicle based on comparing the current direction of the vehicle with the orientation of the danger zone.

19. The non-transitory computer-readable medium of claim 15, wherein the one or more instructions, that cause the device to identify, from the set of danger zones, the danger zone for the vehicle based on the current location, direction, and speed of the vehicle, cause the device to:

exclude, from the set of danger zones, one or more danger zones not associated with the current direction of the vehicle or that have been recently crossed by the vehicle; and identify the danger zone for the vehicle based on excluding the one or more danger zones from the set of danger zones.

20. The non-transitory computer-readable medium of claim 15, wherein the one or more instructions further cause the device to:

adjust a video frame processing frequency based on a proximity of the vehicle to the danger zone and prior to processing the video frame with the model; and utilize a calibration matrix to translate real-world coordinates of the traffic signal into pixel coordinates within the video frame prior to processing the video frame with the model.

* * * * *